(12) United States Patent
Lichtenberger et al.

(10) Patent No.: US 11,846,032 B2
(45) Date of Patent: Dec. 19, 2023

(54) ENHANCED WATER ELECTROLYSIS WITH PROTIC CO-CATALYSTS

(71) Applicant: ARIZONA BOARD OF REGENTS ON BEHALF OF THE UNIVERSITY OF ARIZONA, Tucson, AZ (US)

(72) Inventors: Dennis Lichtenberger, Tucson, AZ (US); Richard S. Glass, Tucson, AZ (US); Dong-Chul Pyun, Tucson, AZ (US); William Brezinski, Tucson, AZ (US); Kayla Clary, Tucson, AZ (US); Metin Karayilan, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 87 days.

(21) Appl. No.: 16/771,597

(22) PCT Filed: Dec. 11, 2018

(86) PCT No.: PCT/US2018/064936
§ 371 (c)(1),
(2) Date: Jun. 10, 2020

(87) PCT Pub. No.: WO2019/118450
PCT Pub. Date: Jun. 20, 2019

(65) Prior Publication Data
US 2020/0299848 A1    Sep. 24, 2020

Related U.S. Application Data

(60) Provisional application No. 62/597,242, filed on Dec. 11, 2017.

(51) Int. Cl.
C25B 1/04        (2021.01)
C25B 9/17        (2021.01)

(52) U.S. Cl.
CPC ............... *C25B 1/04* (2013.01); *C25B 9/17* (2021.01); *Y02E 60/36* (2013.01)

(58) Field of Classification Search
CPC .................................. C25B 1/04; C25B 1/02
See application file for complete search history.

(56) References Cited

U.S. PATENT DOCUMENTS 5,334,292 A    8/1994  Rajeshwar
6,262,212 B1   7/2001  Yeung et al.
(Continued)

FOREIGN PATENT DOCUMENTS

CN    107175106 A * 9/2017 ........... C25B 11/093
WO    WO2018107169 A1   6/2014

OTHER PUBLICATIONS

Li et al. Unique Co-Catalytic Behavior of Protic Ionic Liquids as Multifunctional Electrolytes for Water Splitting. Chemelectrochem Communications. 2016, 3, 204-208. Published Nov. 25, 2015. (Year: 2015).*

(Continued)

*Primary Examiner* — Harry D Wilkins, III
(74) *Attorney, Agent, or Firm* — NGUYEN TARBET LLC

(57) ABSTRACT

Catalyst systems employing inexpensive and readily-available protic co-catalysts to increase a proton reduction rate in a hydrogen evolution reaction (HER) are described herein. The protic co-catalysts function to increase the rate without being consumed in the process of water splitting to hydrogen and oxygen. They may simultaneously serve to stabilize the pH of the water and be the electrolyte to carry the current for the electrolytic splitting of water. The protic co-catalysts also decrease the overpotential energy requirement for the process of water splitting. These protic co-catalysts can be used with both heterogeneous and homogenous catalysts, as (Continued)

well as assist photocatalysis and other processes for the reduction of protons.

13 Claims, 4 Drawing Sheets

(56) References Cited

U.S. PATENT DOCUMENTS

| | | | |
|---|---|---|---|
| 2005/0164297 A1* | 7/2005 | Chen | C25B 11/04 435/7.1 |
| 2008/0014487 A1* | 1/2008 | Highgate | C25B 15/00 429/432 |
| 2009/0020734 A1 | 1/2009 | Jang et al. | |
| 2009/0294282 A1* | 12/2009 | Basseguy | C25B 1/04 204/252 |
| 2013/0118912 A1* | 5/2013 | Reece | H01M 4/86 502/301 |
| 2014/0318979 A1 | 10/2014 | Cronin et al. | |
| 2015/0275379 A1* | 10/2015 | Nakamura | C25B 11/077 205/631 |
| 2017/0121831 A1* | 5/2017 | Kaczur | C25B 1/46 |

OTHER PUBLICATIONS

Shinagawa et ai, Towards Versatile and Sustainable Hydrogen Production through 8, 15.26—Electrocatalytic Water Splitting: Electrolyte Engineering. ChemSusChem, vol. 10, Mar. 9, 2017 (Mar. 9, 2017), p. 1318-1336.

Elmas et al. 'Platinum Terpyridine Metallopolymer Electrode as Cost-Effective Replacement for Bulk Platinum Catalysts in Oxygen Reduction Reaction and Hydrogen Evolution Reaction', ACS Sustainable Chemistry & Engineering. vol. 5, Sep. 25, 2017 (Sep. 25, 2017), p. 10206-10214.

'Polypyrrole', Wikipedia. Jul. 2, 2017 (Jul. 2, 2017). p. 1 [retrieved Feb. 15, 2019 (Feb. 15, 2019) via the internet a <https:llen.wikipedia.org/wlindex.php?title=Polypyrrole&oldid=788636059>].

Suzuki et al., "Hydrogen generation using water-insoluble polymer-bound ruthenium(n) complexes," Chem. Commun., Jan. 1, 1997.

Michelin et al., "Photosensitization and Photocatalysis— Perspectives in Organic Synthesis," ACS Catal, Nov. 19, 2018, 8, 12046-12055.

Suzuki et al., "Hydrogen generation using water-insoluble polymer-bound ruthenium(II) complexes," Chem. Commun., Jan. 1, 1997, 2 pages.

Eloi et al. "Metallopolymers with emerging applications." Materials today 11.4 (2008): 28-36.

* cited by examiner

ENHANCED WATER ELECTROLYSIS WITH PROTIC CO-CATALYSTS

CROSS-REFERENCES TO RELATED APPLICATIONS

This application claims benefit of U.S. Provisional Application No. 62/597,242, filed Dec. 11, 2017, the specification(s) of which is/are incorporated herein in their entirety by reference.

STATEMENT REGARDING FEDERALLY SPONSORED RESEARCH OR DEVELOPMENT

This invention was made with government support under Grant No. CHE1664745 awarded by NSF. The government has certain rights in the invention.

FIELD OF THE INVENTION

The present invention relates to methods of increasing a rate of electrolysis for splitting water to hydrogen and oxygen by employing protic co-catalysts in a hydrogen evolving reaction (HER).

BACKGROUND OF THE INVENTION

There has been a tremendous world-wide interest in developing clean and abundant energy sources as alternatives to fossil fuels to satisfy the rapidly growing need for energy. Development of solar voltaic cells to convert solar energy into electrical energy is very promising. Similarly, wind turbines are being increasingly employed to provide electrical energy. However, these energy sources are intermittent and the electrical energy generated therefrom, while useful, must be used immediately or it is lost. One promising way to store this energy is in the form of chemical bonds. Particularly promising is to warehouse this energy in the strong chemical bond in molecular hydrogen ($H_2$). The development of the "$H_2$ economy", which is a proposed system based on the production, storage, and utilization of hydrogen as an energy carrier, has generated considerable interest.

Hydrogen production is a 200 billion dollar industry worldwide, but current technologies are inefficient in materials and energy. Most hydrogen ($H_2$) is produced from fossil fuels by high temperature and pressure processes, and for every ton of hydrogen produced, about 9-12 tons of carbon dioxide are produced. Alternatively, about 4% of $H_2$ produced today is from electrolysis for splitting water, a process that can be clean and sustainable particularly when alternative energy sources, such as wind and solar power, are used.

Unfortunately, $H_2$ production by the electrolytic splitting of water using current technologies does not have the efficiency to compete with steam reforming of natural gas or other fossil fuel sources, largely because of the current relative costs for electricity from the grid. This can change in the future. Even now, the cost of distributed $H_2$ production by electrolysis of water is comparable to the cost of steam reforming of natural gas if the source of electricity is limited to wind turbines, but the rate of hydrogen production on a large scale is a current limitation. Electrochemical splitting of water to convert it into hydrogen ($H_2$) and oxygen ($O_2$) typically utilizes catalysts, such as platinum (Pt), which is rare and expensive and not available for the large scale. Thus, there remains a need for technologies with improved and efficient performance for generating $H_2$.

The present invention addresses this need by providing a design for co-catalyst systems from readily-available materials that function in tandem with the catalyst to increase the rate of hydrogen production from water by an order of magnitude and more, and thereby provide significant improvements to all existing technologies in which a heterogeneous surface or homogeneous solution catalyst is used to electrocatalytically reduce protons from water to hydrogen.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF SUMMARY OF THE INVENTION

The present invention features protic co-catalysts for use in a water splitting reaction to increase the rate of the hydrogen-evolving reaction (HER) without being consumed. In the context of this invention, a species is protic if it is able to provide protons to the catalyst for HER. A species is a co-catalyst if it increases the rate of the HER without being consumed in the overall water splitting reaction to produce hydrogen and oxygen. In some embodiments, the protic co-catalysts may also simultaneously stabilize the pH of aqueous solutions. In other embodiments the protic co-catalysts also serve as the electrolyte to carry the current for electrolysis. In further embodiments, the protic co-catalysts may significantly reduce the overpotential energy requirement for electrolysis. Alternatively or in conjunction, the protic co-catalysts may increase the current density. Embodiments of the invention are given in the dependent claims. Embodiments of the present invention can be freely combined with each other if they are not mutually exclusive.

In some embodiments, the present invention may be employed in electrolysis systems where a heterogeneous surface, such as a platinum surface, or a homogeneous solution with a water-soluble catalyst, such as a water-soluble hydrogenase mimic, is used to catalytically reduce protons from water to hydrogen. In further embodiments, the co-catalyst can enhance any other processes that involve reduction of protons, including photocatalysis, non-liquid systems, and ion exchange membranes. Since these systems need water as the source of protons, the present invention can increase the rate of hydrogen production from water.

In some preferred embodiments, the invention may be used such that the pH of the solution and $pK_a$ of the co-catalyst are chosen to maximize the concentration of the co-catalyst in the protic form. In other preferred embodiments, the co-catalyst may be selected from species that buffer the pH of water. Many inexpensive and widely-used buffers are available. In contrast to the common uses of such buffers, the invention is unique in that the combination of buffer $pK_a$, solution pH, and concentration can optimize the rate of the hydrogen-evolving reaction. In other embodiments, the protic co-catalyst may be an integral part of a polymer or other macromolecule or material.

Without wishing to limit the invention to any theory or mechanism, the technical feature of the present invention advantageously improves the efficiency of electrolysis in any catalytic system in which the protic co-catalyst is used. Further still, these inexpensive protic co-catalysts are not consumed and as such, they offer considerable cost savings to the energy industry. None of the presently known prior references or work has the unique inventive technical feature of the present invention.

BRIEF DESCRIPTION OF THE SEVERAL VIEWS OF THE DRAWING(S)

The features and advantages of the present invention will become apparent from a consideration of the following detailed description presented in connection with the accompanying drawings in which.

Figure 2:
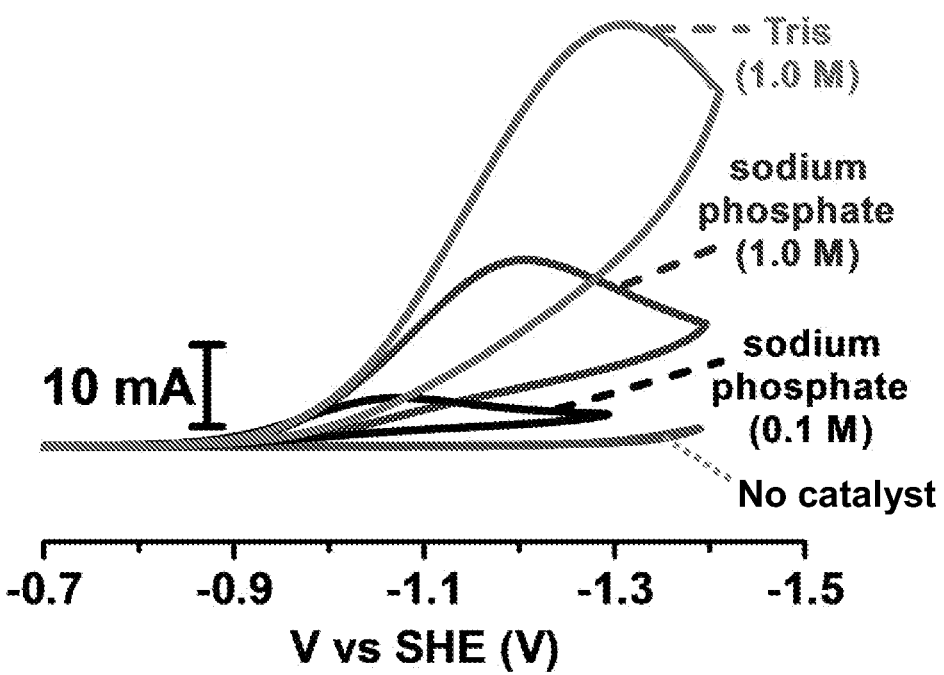

FIG. 2 shows cyclic voltammograms (CV) that illustrate the effect of two protic co-catalysts, one derived from Tris and the other derived from phosphate, on the rate of electrocatalytic hydrogen production from water at pH 7 by a catalyst. The rate is dependent on both the concentration and nature of the co-catalyst. The bottom curve shows the negligible rate in the absence of catalysts.

Figure 3:
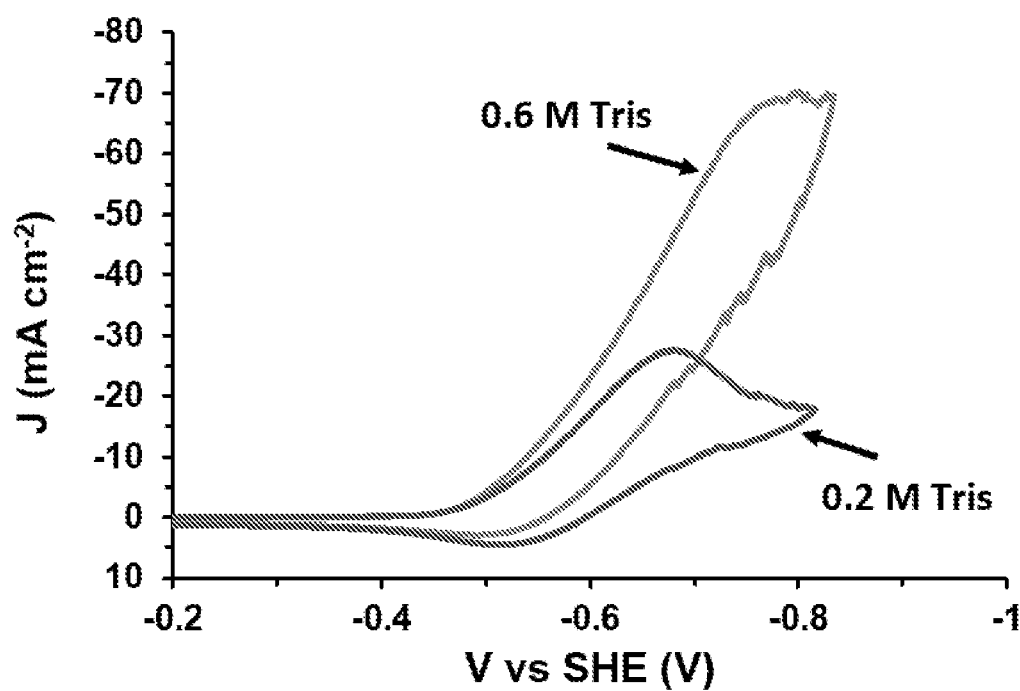

FIG. 3 shows another CV that illustrates the effect of concentration of the protic co-catalyst derived from Tris on the rate of electrocatalytic hydrogen production from water at pH 7 by a heterogeneous catalyst, in this case a planar platinum surface. The lines become jagged due to the rapid production of hydrogen bubbles.

Figure 4A:
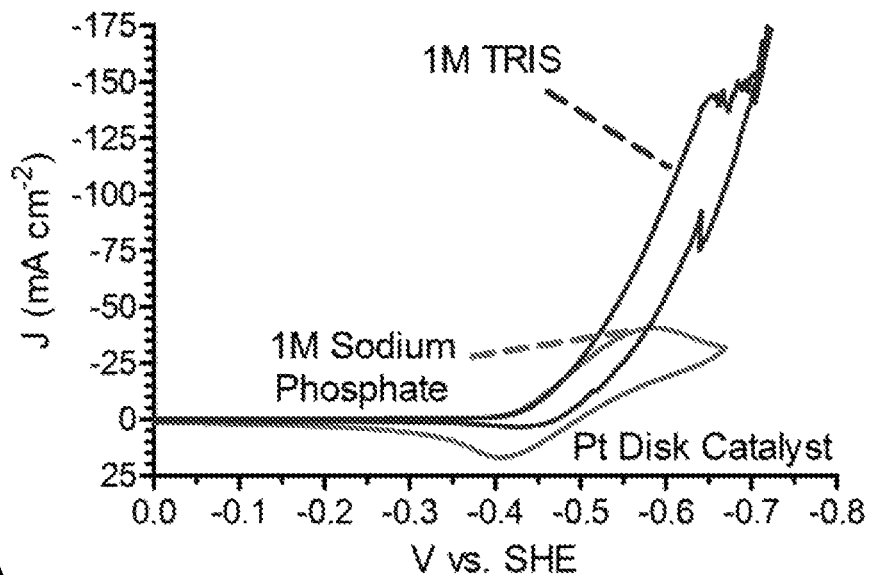
Figure 4B:
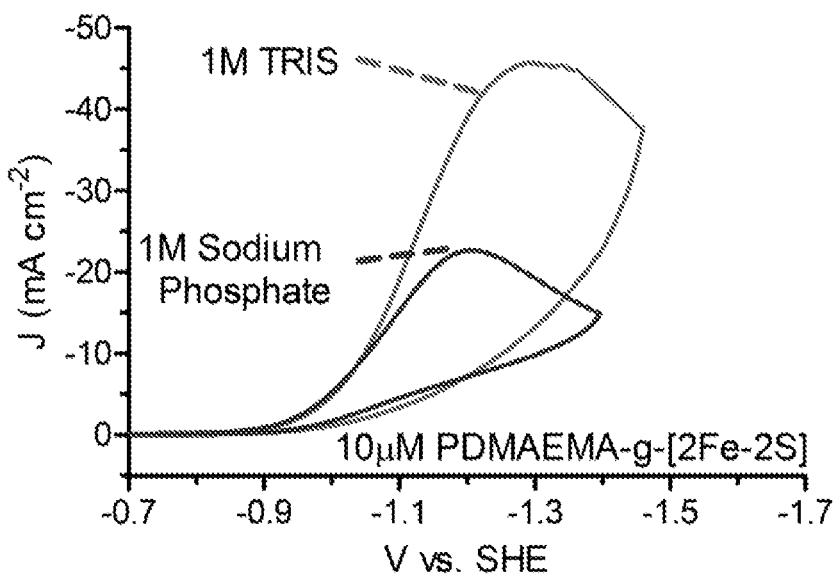
Figure 4C:
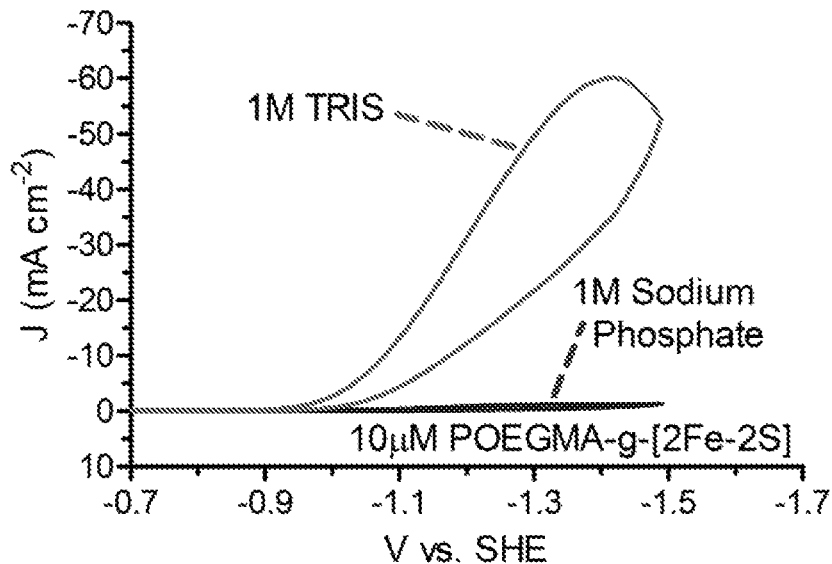

FIG. 4A-4C show CV comparisons of 1 M sodium phosphate and 1 M Tris solution conditions adjusted to pH 7 for Pt (FIG. 4A), PDMAEMA-g-[2Fe-2S] (FIG. 4B), and POEGMA-g-[2Fe-2S] (FIG. 4C). This CV data indicates the improvement of having a higher concentration of protic species in solution across different catalyst examples while maintain the same pH. The CV scans were done at a sweep rate of 0.1 V/s using a platinum disk electrode for FIG. 4A and glassy carbon disk electrode for FIGS. 4B and 4C. The catalyst concentration used in FIGS. 4B and 4C was 10 µM based on [2Fe-2S] content using IR spectroscopy.

Figure 5:
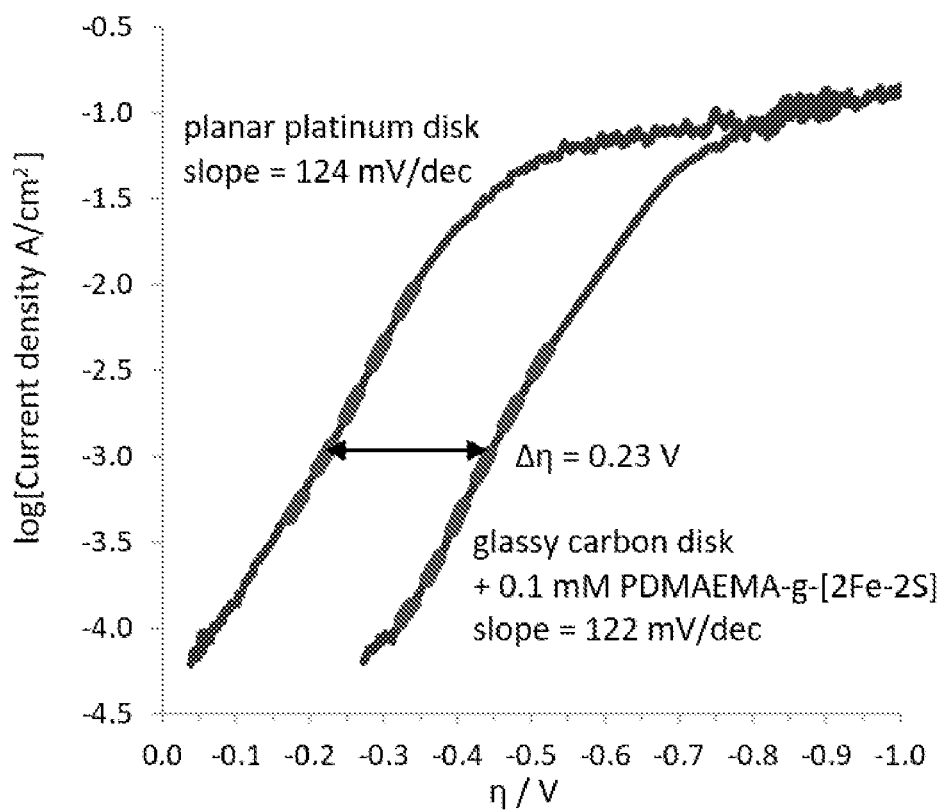

FIG. 5 shows a Tafel comparison of a homogeneous catalyst to Pt in 1 M Tris solution at pH 7 and a glassy carbon disk electrode in the same solution with added PDMAEMA-g-[2Fe-2S] (100 µM [2Fe-2S] by IR, 1.9 mg/mL mass loading). Currents were measured by linear sweep voltammetry at a rate of 5 mV/s with 1600 rpm magnetic stirring. The dashed overlay lines show the segments for determination of the Tafel slopes.

Figure 6:
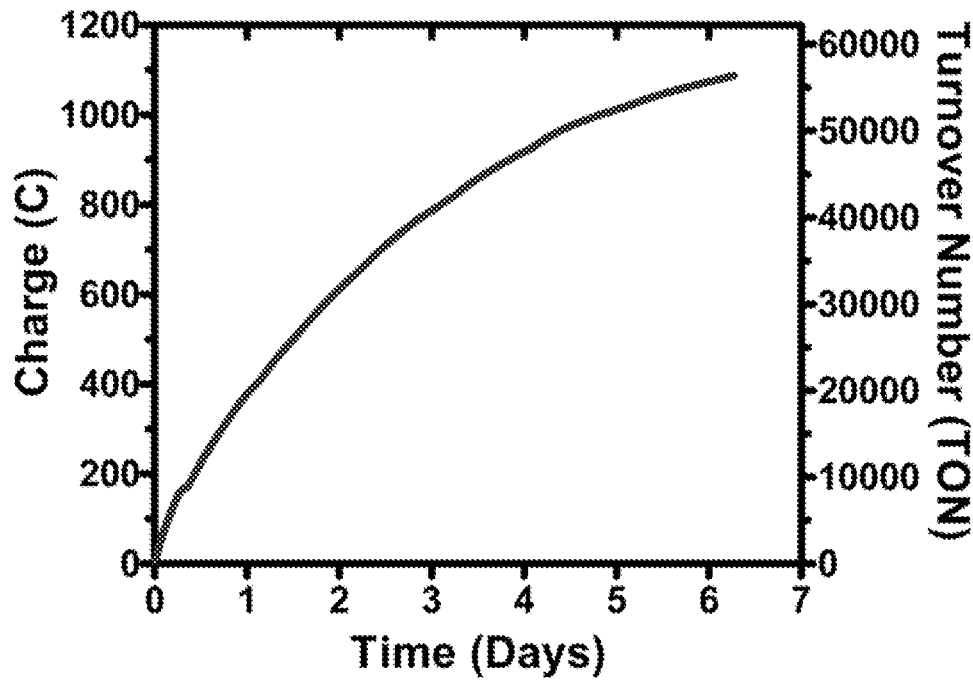

FIG. 6 is a plot of charge vs. time resulting from a controlled potential electrolysis (CPE) experiment in a CV cell using 1.0 M Tris solution. The working electrode was a glassy carbon disk of 3 mm diameter. A counter electrode was present and produced copious amounts of $O_2$. Using a 25 µM solution of PDMAEMA-g-[2Fe-2S], over 1000 coulombs of charge were passed over 6 days at a holding voltage of −1.09 V vs SHE, yielding nearly 60,000 molecules of hydrogen per molecule of catalyst in this experiment. The limiting factor was the catalyst and not the co-catalyst.

DETAILED DESCRIPTION OF THE INVENTION

Figure 1A:
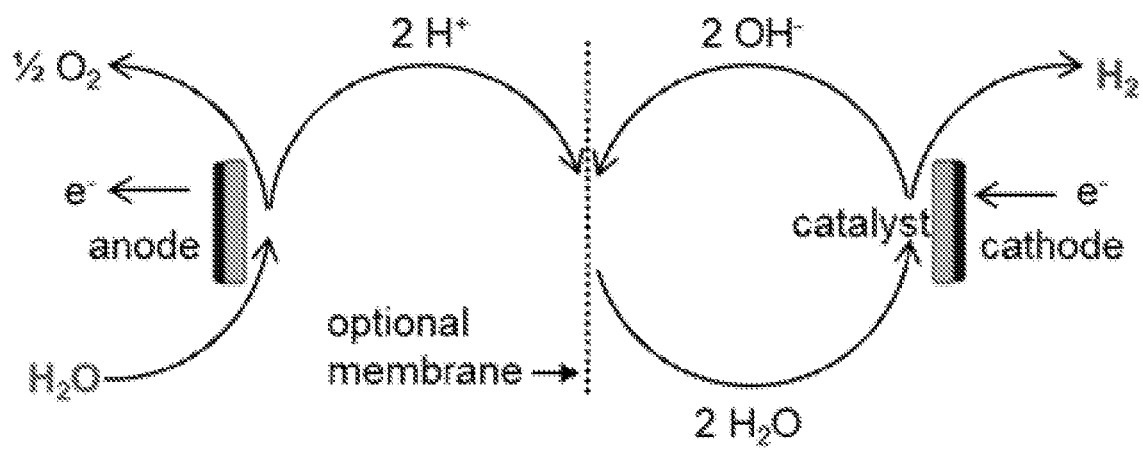
FIG. 1A shows a reaction schematic of water-splitting electrolysis.
Figure 1B:
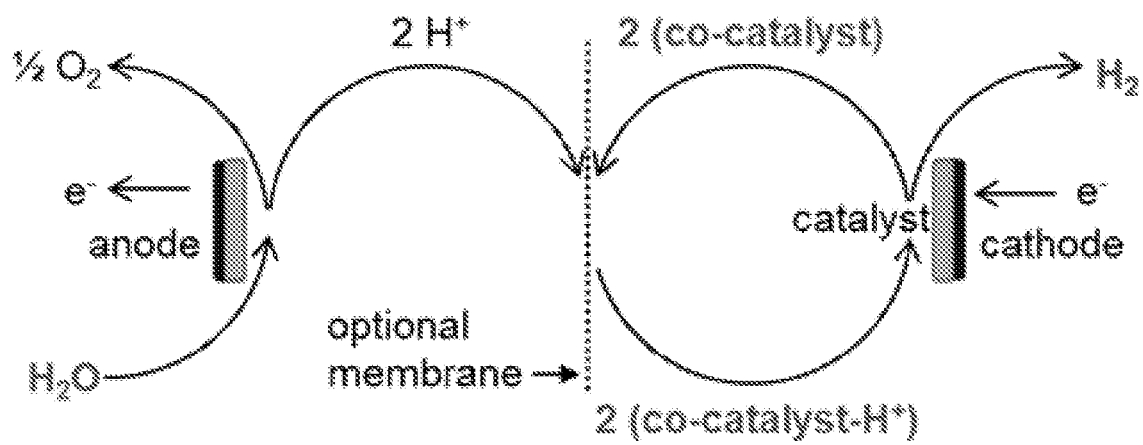
FIG. 1B shows a reaction schematic of water-splitting with a protic co-catalyst of the present invention.

As known to one of ordinary skill in the art, electrolysis is a process of using electricity to split water into hydrogen and oxygen, as depicted schematically in FIG. 1A. In a non-limiting example of an aqueous electrochemical system, two electrodes are placed in an aqueous solution of ions. An oxidation reaction at the anode produces oxygen and protons from water, and a reduction reaction at the cathode produces hydrogen and hydroxide ions from water. For instance, a water electrolyzer may comprise an anode and a cathode connected via an external power source and immersed in a conducting electrolyte. The general process of electrolysis involves applying a current to the electrolyzer via the external power source, thereby causing the water to react at the anode to form oxygen and positively charged hydrogen ions (protons) and causing the water to react at the cathode to form molecular $H_2$ and $OH^+$. In some embodiments, electrons flow through external circuitry of the power source to the cathode, and the $OH^+$ from the cathode is neutralized by the $H^+$ from the anode to form water. In some embodiments, the system may include a membrane through which hydrogen ions selectively move to the cathode side, although this membrane is optional. As depicted schematically in FIG. 1B, a protic co-catalyst can increase the rate of the reaction by assisting the transfer of protons to the catalyst at the cathode, and avoiding the formation of hydroxide ions. The protic co-catalyst is represented in FIG. 1B as "(co-catalyst-$H^+$)".

As used herein, the term "co-catalyst" is defined as a species that increases the rate of catalytic reduction of protons to molecular hydrogen without being consumed. For example, the co-catalysts described herein carry the protons for rapid reduction by a primary catalyst without the co-catalyst itself being consumed. In one embodiment, the protons are supplied from a corresponding oxidation side of a complete cell reaction for water splitting, where oxygen and protons are produced (the oxygen evolving reaction, OER). In some embodiments, the co-catalyst may be a buffer that stabilizes a pH. All aqueous electrochemical systems require some type of electrolyte solution in order to carry the current. The electrolyte composition may vary greatly depending on the process conditions and the type of electrolysis being conducted. In other embodiments, the co-catalyst may be also act as an electrolyte that carries the current.

As used herein, the term "protic", when describing a compound such as the co-catalyst, refers to said compound having at least one $H^+$ ion, or proton, that it can donate. In some embodiments, a protic compound may be monoprotic (capable of donating one proton), diprotic (capable of donating two protons), or polyprotic (capable of donating multiple protons).

As used herein, the protonated or protic form refers to when the co-catalyst has a proton to contribute to the HER reaction. Conversely, the deprotonated form is when this proton is dissociated from the molecule. The concentration of the protonated or protic form relative to the deprotonated form depends on the pH compared to the $pK_a$. As a general rule, when the $pH=pK_a$, the protonated and deprotonated forms are in equal concentration. When the $pH<pK_a$, the solution is more acidic and excess protons will protonate the co-catalyst, therefore the concentration of the protonated form will be greater than the concentration of the deprotonated form. When the pH>pKa, the solution is more basic and the protons will dissociate from the co-catalyst, therefore the concentration of the deprotonated form will be greater than the protonated form.

In preferred embodiments, any level of protonation of the co-catalyst can help accelerate the rate of the reaction. In more preferred embodiments, the more protonated a co-catalyst, the better it is at accelerating the reaction rate. As an example, a preferred embodiment of the co-catalyst is in its majority protonated state; however, being majority protonated is not necessarily required in the present invention. For example, a phosphate buffer that is 42% protonated can still accelerate the rate of the reaction.

The present invention may be applied to any electrochemical system for the reduction of protons to hydrogen. In embodiments for standard alkaline electrolysis, for example, appropriately selected protic co-catalysts will operate in an alkaline environment.

Referring now to FIGS. 1A-6, embodiments of the present invention feature a method of increasing a hydrogen ($H_2$) generation rate of an electrolysis process in which protons from an aqueous medium are reduced to $H_2$. The method may comprise adding a protic co-catalyst to the aqueous medium, thereby increasing the rate of $H_2$ generation without being consumed during the electrolysis process. Preferably, the protic co-catalyst is in a protonated state. In one embodiment, a pH of the aqueous medium and a $pK_a$ of the co-catalyst are selected such that the co-catalyst is in the protonated state. For example, the pH of the aqueous medium may be less than the $pK_a$ of the co-catalyst.

In some embodiments, the protic co-catalyst may be a pH stabilizer. In other embodiments, the protic co-catalyst can act as an electrolyte that carries a current for the electrolysis process. In still other embodiments, the protic co-catalyst can decrease an energy requirement of the electrolysis process and/or increase the current density.

According to another embodiment, the present invention features a method for improving a hydrogen ($H_2$) generation rate of an electrolysis process where $H_2$ is generated by reducing protons in an aqueous medium. In one embodiment, the method may comprise adding a catalyst to the aqueous medium and adding a protic co-catalyst to the aqueous medium. Preferably, the protic co-catalyst is in a protonated state. This may be achieved by selecting the pH of the aqueous medium and a pKa of the co-catalyst are selected such that the co-catalyst is in a protonated state. For instance, the pH of the aqueous medium may selected to be less than the pKa of the co-catalyst. In one preferred embodiment, the protic co-catalyst is in a majority protic state.

In some embodiments, the catalyst can reduce protons to generate $H_2$. In preferred embodiments, the protic co-catalyst can increase the rate of $H_2$ generation without being consumed during the electrolysis process. In other preferred embodiments, the protic co-catalyst can decrease an energy requirement of the electrolysis process and/or increase the current density. In yet other preferred embodiments, the protic co-catalyst can stabilize a pH of the aqueous solution and act as an electrolyte that carries a current for electrolysis.

In conjunction with any of the methods described above, the electrolysis process may comprise a non-liquid process, a solid state process, water splitting, ion exchange, or any process in which the delivery of protons is a mechanistic feature. The methods of the present invention may also be utilized in photocatalysis, which in some embodiments, does not necessarily need electrolysis. In one embodiment, the process may further utilize a catalyst to reduce the protons to generate $H_2$.

In preferred embodiments, the aqueous medium may comprise water. Examples of the aqueous medium include, but are not limited to, an acid solution, an aqueous suspension, an aqueous solution, an aqueous emulsion, or membrane with water in said membrane. In some embodiments, the aqueous medium may be separated into multiple compartments by one or more membranes, or alternatively a gel. The membranes may be permeable membranes or gel membranes. In other embodiments, the aqueous medium may be a proton source from another molecule, material, or process.

According to another embodiment, the present invention may feature an electrolyzer system for generating hydrogen ($H_2$) via an electrolysis reaction. In some embodiments, the system may comprise an anode, a cathode comprising a catalyst, an external power supply operatively coupled to the anode and cathode, a protic co-catalyst that is in a majority protonated state, and an aqueous medium. In one embodiment, the cathode may function as the catalyst. Alternatively, the cathode may comprise an electrode functioning with the catalyst.

In some embodiments, the anode and cathode may be in contact with or disposed in the aqueous medium. In other embodiments, the protic co-catalyst may be disposed in the aqueous medium. In further embodiments, the electrolyzer system may further include one or more membranes that separate the aqueous medium into multiple compartments.

In some embodiments, the external power supply may be configured to drive the electrolysis reaction by passing an electric current between the anode and cathode to effect water splitting of the aqueous medium. In one embodiment, at least a portion of the external power supply may be derived from an alternative energy source, such as solar or wind power. In one embodiment, at least a portion of the external power supply may be derived from the power grid.

In preferred embodiments, the catalyst can reduce protons from the water splitting of the aqueous medium, thus generating $H_2$. In other preferred embodiments, the protic co-catalyst can increase a rate of $H_2$ generation without being consumed during the electrolysis reaction. In some embodiments, the protic co-catalyst can stabilize a pH of the aqueous solution and act as an electrolyte that carries a current for electrolysis. In further embodiments, the protic co-catalyst may decrease an energy requirement of the electrolysis reaction and/or increase the current density.

In accordance with any of the methods and systems described herein, without wishing to limit the present invention to a particular theory or mechanism, the pH of the solution and pKa of the protic co-catalyst are chosen such that the concentration of the protic form of the co-catalyst is maximized. As a non-limiting example, the co-catalyst is more than 50% in the form to deliver protons (majority protic form). In some embodiments, the pH may be in a range from about 1 to 10. In one embodiment, the pH may be in a range from about 1 to 7. In another embodiment, the pH may be in a range from about 7 to 10. In other embodiments, the pKa of the co-catalyst may be in a range from about 2 to 12. In one embodiment, the pKa of the co-catalyst may be in a range from about 2 to 7. In another embodiment, the pKa of the co-catalyst may be in a range from about 7 to 12.

In some embodiments, the concentration of the co-catalyst may range from about 0.01 M to about 1 M. In one embodiment, the concentration of the co-catalyst may range from about 0.01 M to about 0.5 M. In another embodiment, the concentration of the co-catalyst may range from about 0.5 M to about 1 M. In some other embodiments, the concentration of the co-catalyst may range up to saturation, defined herein as the maximum of co-catalyst solubility.

Without wishing to limit the present invention to a particular theory or mechanism, the use of the protic co-catalyst may reduce the amount of the primary catalyst. In some embodiments, for a homogeneous catalyst, the catalyst concentration may range from about 0.1 µM to about 10 µM. In another embodiment, the concentration of the catalyst may range from about 10 µM to about 100 µM. In other embodiments, the concentration of the catalyst may range from about 100 µM to about 500 µM. In yet other embodiments, the concentration of the catalyst may range from about 500 µM to about 1,000 µM.

Examples of molecules that function as protic co-catalysts at an appropriate pH for each molecule and that may be used in accordance with any embodiment of the present invention include, but are not limited to, maleate, bicine, sodium phosphate, sodium dihydrogen phosphate, sodium carbonate, di-sodium hydrogenphosphate, glycine, glycylglycine, imidazole, citrate, triethanolamine, tricine, boric acid, ammonium acetate, magnesium acetate, potassium acetate, sodium acetate, N-(2-acetamido)-2-am inoethanesulfonic acid (ACES), N-(2-acetamido)iminodiacetic acid (ADA), taurine (AES), 2-amino-2-methyl-1-propanol (AMP), 2-amino-2-methyl-1,3-propanediol (AMPD), N-(1,1-dimethyl-2-hydroxyethyl)-3-amino-2-hydroxypropanesulfonic acid (AMPSO), N, N-bis(2-hydroxethyl)-2-aminoethanesulfonic acid (BES), 4-(cyclohexylamino)-1-butanesulfonic acid (CABS), N-cyclohexyl-3-aminopropanesulfonic acid (CAPS), 3-(cyclohexyl-amino)-2-hydroxy-1-propanesulfonic acid (CAPSO), N-cyclohexyl-2-aminoethanesulfonic acid (CHES), N,N-bis(2-hydroxyethyl)-3-amino-2-hydroxypropanesulfonic acid (DIPSO), N-(2-hydroxyethyl)piperazine-N'-(4-butanesulfonic acid) (HEPBS), 4-(2-hydroxyethyl)-1-piperazineethanesulfonic acid (HEPES), 4-(2-hydroxyethyl)piperazine-1-propanesulfonic acid (HEPPS), 4-(2-hydroxyethyl)-piperazine-1-(2-Hydroxy)-propanesulfonic acid (HEPPSO), 4-morpholineethanesulfonate (MES), 4-(N-morpholino)butanesulfonic acid (MOBS), 3-morpholinopropane-1-sulfonic acid (MOPS), 3-morpholino-2-hydroxy-propanesulfonic acid (MOPSO), 1,4-piperazineethanesulfonate (PIPES), piperazine-N,N'-bis(2-hydroxypropanesulfonic acid) (POPSO), N-tris(hydroxymethyl)-methyl-4-aminobutanesulfonic acid (TABS), N-[tris(hydroxymethyl)methyl]-3-amino-propanesulfonic acid (TAPS), 2-hydroxy-3-[tris(hydroxymethyl)methylamino]-1-propanesulfonic acid (TAPSO), 2-[[1,3-dihydroxy-2-(hydroxymethyl)propan-2-yl]amino]-ethanesulfonic acid (TES), tris-(hydroxymethyl)-aminomethane (Tris), Bis-Tris, and Bis-Tris-Propane.

In some embodiments, examples of other co-catalysts may include polymers such as, for example, poly((N,N-dimethylaminoethyl) methacrylate) (PDMAEMA) or poly((oligoethylene glycol) methacrylate) (POEGMA) from a methylacrylate macromonomer with oligomeric ethylene glycol pendant groups as side chain. Additional embodiments of the co-catalysts may include protic polymers and macromolecular species that include, but are not limited to, other styrenic and methacrylic polymers, dendrimers, hydrogels, polypeptides, proteins, polysaccharides, cyclodextrines, micelles, amphiphilic polymers, and fibers. In some other embodiments, the co-catalyst may also carry protic donor groups to accelerate $H_2$ formation.

Consistent with the methods and systems described herein, the catalyst may be a homogenous catalyst. In some embodiments, the catalyst is a water-soluble metallopolymer. In one embodiment, the water-soluble metallopolymer may comprise a hydrogen evolution reaction (HER) electrocatalytic complex. The HER electrocatalytic complex may be a diiron-disulfide complex [2Fe-2S].

In another embodiment, the water-soluble metallopolymer may comprise the HER electrocatalytic complex and a polymer coupled to the HER electrocatalytic complex. In some embodiments, the polymer may be derived from functional unsaturated vinyl monomers bearing non-polar and water-soluble side chain groups. Non-limiting examples of the vinyl monomers include styrenic monomers or methacrylate monomers. For instance, the polymer may be poly((N,N-dimethylaminoethyl) methacrylate) (PDMAEMA) or poly((oligoethylene glycol) methacrylate) (POEGMA) from a methylacrylate macromonomer with oligomeric ethylene glycol pendant groups as side chain. Additional examples of metallopolymeric electrocatalysts are described in PCT/US2017/065632, the specification of which is incorporated herein in its entirety by reference.

In other embodiments, the catalyst may be a heterogeneous catalyst. In one embodiment, the catalyst may be comprised of platinum. In other embodiments, the heterogeneous catalyst may be comprised of for example, but not limited to, alloys and oxides of iridium, nickel, nickel-iron, and nickel-oxide. Consistent with previous embodiments, the cathode may be further comprised of a carbon material. Examples of the carbon material include, but are not limited to, graphite, glassy carbon, or the like.

In some embodiments, the polymers may be co-catalysts by themselves and can work separately with another catalyst. In alternative embodiments, a catalyst may be incorporated into the polymer to make an all-in-one macromolecule which has both a catalyst portion and the polymer is the co-catalyst portion. For example, the macromolecule may be a metallopolymer (or other similar structures) that comprises a catalyst (from the "metallo" part) combined with a co-catalyst (the polymer part). The polymer part may further impart additional functionalities, such as increased solubility, to the macromolecule.

In preferred embodiments, the present invention may be applied to any technology that produces hydrogen with water as the source of the hydrogen atoms. The hydrogen molecules may be used in a variety of applications, such as internal combustion engines, fuel cells, batteries, and hydrogenation of raw materials. The present invention may also be used in electrocatalytic hydrogen reduction of chemical feedstocks. Other applications may include, but are not limited to, any splitting of molecules using an anode and cathode in an aqueous solution.

EXAMPLES

The following are non-limiting examples of the present invention. It is to be understood that said examples are provided for the purpose of demonstrating the present invention in practice, and is in no way intended to limit the invention. Equivalents or substitutes are within the scope of the invention. In particular, the present invention may be practiced with heterogeneous catalysts or homogeneous catalysts.

In one embodiment, the PDMAEMA-g-[2Fe-2S] metallopolymer (Scheme 1) was catalytically active for $H_2$ generation at low potentials, and modest metallopolymer loadings (1.6 mg/mL in sodium phosphate adjusted to pH 7.0). In another embodiment, the current densities generated by the PDMAEMA-g-[2Fe-2S] metallopolymer were comparable to that of a Pt electrode for $H_2$ generation in a Tris solution (FIG. 5).

Scheme 1. Non-limiting example of a catalyst: PDMAEMA-g-[2Fe-2S] metallopolymer.

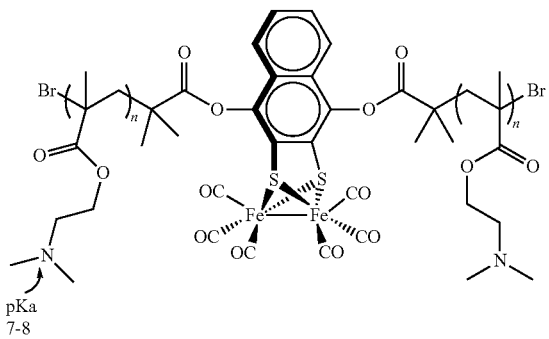

pKa 7-8

In another embodiment, the POEGMA-g-[2Fe-2S] metallopolymer (Scheme 2) was catalytically active for $H_2$ generation at low potentials, and modest metallopolymer loadings with addition of the protic co-catalyst derived from Tris at pH 7. This metallopolymer had barely perceptible activity at the same potentials without the addition of Tris (FIG. 4C).

Scheme 2. Non-limiting example of a catalyst: POEGMA-g-[2Fe-2S] metallopolymer.

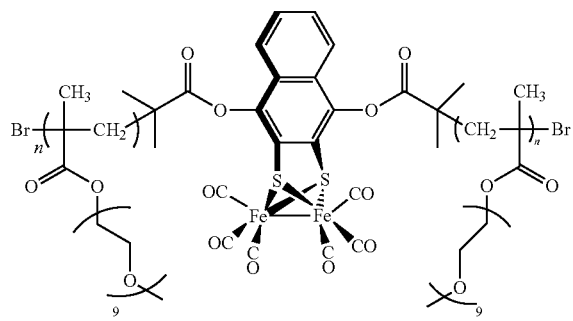

Effects of Protic Co-Catalyst on Catalysis.

FIG. 2 shows cyclic voltammograms comparing HER current of a glassy carbon (GC) electrode in pH 7.0 aqueous Tris (1.0 M) without catalyst (bottom curve) and with a PDMAEMA-g-[2Fe-2S] metallopolymer catalyst in the same solution and in 1.0 M or 0.1 M sodium phosphate. Polymer mass loading was 0.19 mg/mL.

One of the key advantages of the present invention is that a plethora of inexpensive molecules for aqueous media can be adjusted to protic co-catalysts with adjustment of pH. Furthermore, modulation of co-catalyst identity and concentration can provide a facile method to improve catalytic performance without the need to increase catalyst loading. As a non-limiting example, as shown in FIG. 2, electrochemical simulations indicated current density was being limited by the concentration of the conjugate acid (i.e. $NaH_2PO_4$ in sodium phosphate) consistent with the observation of greatly increased current densities at increased co-catalyst concentration. To further increase the concentration of the protic co-catalyst, tris(hydroxymethyl)aminomethane (Tris) was used as it has a higher solubility and higher proportion of protic species at pH 7. This change in protic co-catalyst significantly increased current density without changing the reduction potential required to initiate catalysis. Such high current densities allowed for the catalyst concentrations to be lowered. It was surprisingly discovered that catalysts loadings as low as 100 nM [2Fe-2S] (0.0002% w/w) gave appreciable, and reproducible catalytic currents. The ability to increase catalytic activity by modulating an inexpensive protic co-catalyst highlights the utility of this invention.

Referring to FIG. 3, electrocatalytic CV experiments with a heterogenous planar platinum catalyst show a dependence on the concentration of the protic co-catalyst used. As with the case of homogenous HER, the current density can be significantly increased by increasing the concentration of the protic species without modification of the heterogeneous surface.

The CV comparisons between protic co-catalysts derived from 1 M sodium phosphate and 1 M Tris solution conditions in FIG. 4A-4C show increased rates of catalysis across several examples of catalysts. FIG. 4A uses Pt in a sodium phosphate aqueous system. In neutral conditions, sodium phosphate ($pK_{a,2}$=7.21) has an approximate concentration of 0.40 M in the monobasic form ($NaH_2PO_4$), while Tris ($pK_a$=8.06) exists in a concentration of 0.92 M in the protic form. The versatility to this approach is demonstrated in FIGS. 4B and 4C showing that metallopolymer systems, PDMAEMA-g-[2Fe-2S] and POEGMA-g-[2Fe-2S], also have increased rates by increasing the concentration of a protic co-catalyst. By increasing the concentration without changing the pH, the current density (related to the rate of catalysis) was increased to 104 mA $cm^{-2}$ (FIG. 4A), 22 mA $cm^{-2}$ (FIG. 4B), and 58 mA $cm^{-2}$ (FIG. 4C).

Linear sweep voltammetry was performed at a scan rate of 5 mV/s in a rapidly stirred solution of 1 M Tris using a planar Pt disk electrode, and in the same solution using a planar glassy carbon electrode and added PDMAEMA-g-[2Fe-2S] (0.1 mM [2Fe-2S] by IR). The experimentally determined Tafel plot is shown in FIG. 5, with the dashed line highlighting the 200 mV region used to determine the Tafel slope of each system. A Tafel slope of 124 mV/decade of current was obtained for Pt. The PDMAEMA system matches this performance almost exactly, with a Tafel slope of 122 mV/decade of current and an increased overpotential of only 0.23 V to match the current density of the Pt electrode. Extending the Tafel figure to 1 V overpotential shows that the platinum electrode and the glassy carbon electrode with 0.1 millimolar PDMAEMA catalyst converge to the same current density of about 100 mA/$cm^2$. Furthermore, a Faradaic yield of 93% was determined by gas chromatography to confirm the currents were truly representative of HER catalysis. The same method gave a Faradaic yield of 96% for a Pt electrode, which confirms the system is operating at a Faradaic yield near unity.

Referring to FIG. 6, the CPE experiment was run at a voltage of −1.09 V vs. SHE, corresponding to an overpotential of 1.09-0.41=0.68 V at pH 7. The current density was 40 mA/$cm^2$ or greater for 24 hours. Generation of bubbles ($O_2$) at the counter electrode was observed in the cell during operation and in close proximity to the working electrode (which also had bubbles confirmed to be $H_2$). The coulombs translate to generation of nearly 60,000 molecules of hydrogen per molecule of catalyst.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A method of increasing a hydrogen ($H_2$) generation rate of an electrolysis process in which protons from an aqueous medium are reduced to $H_2$, the method comprising adding a protic co-catalyst to the aqueous medium, wherein a pH of the aqueous medium is near-neutral or higher, and the protic co-catalyst is in a majority protic state and is positively charged, wherein the protic co-catalyst increases the rate of $H_2$ generation without being consumed during the electrolysis process.

2. The method of claim 1, wherein the protic co-catalyst is a pH stabilizer.

3. The method of claim 1, wherein the protic co-catalyst acts as an electrolyte that carries a current for the electrolysis process.

4. The method of claim 1, wherein the electrolysis process comprises photocatalysis, a non-liquid process, a solid state process, water splitting, or ion exchange.

5. The method of claim 1, wherein the protic co-catalyst decreases an energy requirement of the electrolysis process.

6. The method of claim 1, wherein the protic co-catalyst comprises imidazole, taurine (AES), 2-amino-2-methyl-1-propanol (AMP), 2-amino-2-methyl-1,3-propanediol (AMPD), tris-(hydroxymethyl)-aminomethane (Tris), bis-(hydroxymethyl)aminomethane (Bis-Tris), or Bis-Tris-Propane (BTP).

7. The method of claim 1, wherein the protic co-catalyst comprises a polymer.

8. A method for improving a hydrogen ($H_2$) generation rate of an electrolysis process, wherein $H_2$ is generated by reducing protons in an aqueous medium, wherein a pH of the aqueous medium is near-neutral or higher, the method comprising:
   a. adding a catalyst to the aqueous medium; and
   b. adding a protic co-catalyst to the aqueous medium, wherein the protic co-catalyst is in a majority protic state and is positively charged;

wherein the catalyst reduces protons of the aqueous medium to generate $H_2$, wherein the protic co-catalyst increases the rate of $H_2$ generation without being consumed during the electrolysis process.

9. The method of claim 8, wherein the protic co-catalyst stabilizes a pH of the aqueous solution and acts as an electrolyte that carries a current for electrolysis.

10. The method of claim 8, wherein the protic co-catalyst decreases an energy requirement of the electrolysis process.

11. The method of claim 8, wherein the protic co-catalyst comprises imidazole, taurine (AES), 2-amino-2-methyl-1-propanol (AMP), 2-amino-2-methyl-1,3-propanediol (AMPD), tris-(hydroxymethyl)-aminomethane (Tris), bis-(hydroxymethyl)aminomethane (Bis-Tris), or Bis-Tris-Propane (BTP).

12. The method of claim 8, wherein the protic co-catalyst comprises a polymer.

13. The method of claim 8, wherein the catalyst is a homogeneous or heterogeneous catalyst.

* * * * *